United States Patent
Sakai

(10) Patent No.: US 9,372,327 B2
(45) Date of Patent: Jun. 21, 2016

(54) ZOOM LENS AND IMAGE-PICKUP APPARATUS HAVING THE SAME

(71) Applicant: CANON KABUSHIKI KAISHA, Tokyo (JP)

(72) Inventor: Hideki Sakai, Sakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 14/027,427

(22) Filed: Sep. 16, 2013

(65) Prior Publication Data

US 2014/0085528 A1    Mar. 27, 2014

(30) Foreign Application Priority Data

Sep. 21, 2012 (JP) ................. 2012-207972

(51) Int. Cl.
*G02B 15/14* (2006.01)
*G02B 27/64* (2006.01)
*G02B 15/173* (2006.01)

(52) U.S. Cl.
CPC .............. *G02B 15/14* (2013.01); *G02B 15/173* (2013.01); *G02B 27/646* (2013.01)

(58) Field of Classification Search
CPC ........ G02B 15/00; G02B 15/14; G02B 15/16; G02B 15/20; G02B 13/004; G02B 13/006; G02B 13/009; G02B 13/16; G02B 13/18; G02B 15/173
USPC .......................................... 359/676, 686, 687
See application file for complete search history.

(56) References Cited

U.S. PATENT DOCUMENTS

| | | | |
|---|---|---|---|
| 5,260,834 A | 11/1993 | Shibata et al. | |
| 7,286,298 B2 * | 10/2007 | Yamashita | G02B 15/173 359/687 |
| 7,471,460 B2 * | 12/2008 | Saruwatari | G02B 15/173 359/686 |
| 2009/0040604 A1 * | 2/2009 | Obu et al. | 359/432 |
| 2009/0296232 A1 * | 12/2009 | Okada | 359/689 |
| 2010/0208321 A1 * | 8/2010 | Matsuo | 359/207.6 |
| 2012/0307377 A1 * | 12/2012 | Horiuchi | 359/687 |
| 2013/0038765 A1 * | 2/2013 | Fujisaki | 348/294 |
| 2013/0300913 A1 * | 11/2013 | Sakai | G03B 9/06 348/344 |

FOREIGN PATENT DOCUMENTS

JP         04-307509 A     10/1992
JP       2000-330016 A     11/2000

* cited by examiner

*Primary Examiner* — Thong Nguyen
(74) *Attorney, Agent, or Firm* — Rossi, Kimms & McDowell LLP

(57) ABSTRACT

A zoom lens includes, in order from an object side to an image side, a first lens unit having a positive refractive power, a second lens unit having a negative refractive power, a third lens unit having a positive refractive power, and a fourth lens unit having a positive refractive power. Each lens unit moves so that a distance between adjacent lens units changes during zooming. The third lens unit includes a positive lens $G3i$ closest to the image side which has a concave meniscus surface on an image side. A conditional expression $0.03 < R3i2/ft < 0.25$ is satisfied where $R3i2$ is a radius of curvature of a lens surface on the image side of the positive lens $G3i$, and $ft$ is a focal length of the overall system at a telephoto end.

10 Claims, 7 Drawing Sheets

ZOOM LENS AND IMAGE-PICKUP APPARATUS HAVING THE SAME

BACKGROUND OF THE INVENTION

1. Field of the Invention

The present invention relates to a zoom lens, and is suitable for an imaging optical system used for an image-pickup apparatus such as a digital still camera, a video camera, a monitoring camera, a broadcast camera, and a film-based capturing camera.

2. Description of the Related Art

Since an imaging optical system for an image-pickup apparatus is required for a short lens overall length, a small overall system, and a zoom lens having a high zoom ratio. It is also required for a high optical performance in the entire zoom range and over the whole object distance.

There is known a four-unit zoom lens that includes, in order from an object side to an image side, a first lens unit of a positive refractive power, a second lens unit of a negative refractive power, a third lens unit of a positive refractive power, and a fourth lens unit of a positive refractive power.

U.S. Pat. No. 5,260,834 discloses a small zoom lens in which a second lens unit and a third lens unit are configured to move in zooming.

Japanese Patent Laid-Open No. ("JP") 2000-330016 discloses a zoom lens having a zoom ratio of about 10 in which each lens unit is configured to move in zooming.

It is important for these four-unit zoom lenses to appropriately set a lens configuration of a third lens unit particularly among lens configurations of each lens unit, and a moving amount of the third lens in zooming for a high zoom ratio and a small overall system.

SUMMARY OF THE INVENTION

The present invention provides a zoom lens and an image-pickup apparatus having the same having a small overall system, a high zoom ratio, and a high optical performance over an overall zoom range.

A zoom lens according to the present invention includes, in order from an object side to an image side, a first lens unit having a positive refractive power, a second lens unit having a negative refractive power, a third lens unit having a positive refractive power, and a fourth lens unit having a positive refractive power. Each lens unit moves so that a distance between adjacent lens units changes during zooming. The third lens unit includes a positive meniscus lens $G3i$ disposed closest to the image side and having a concave surface on the image side. A conditional expression $0.03 < R3i2/ft < 0.25$ is satisfied, where $R3i2$ is a radius of curvature of the concave surface on the image side of the positive meniscus lens $G3i$, and ft is a focal length of the zoom lens at a telephoto end.

Further features of the present invention will become apparent from the following description of exemplary embodiments with reference to the attached drawings.

DESCRIPTION OF THE EMBODIMENTS

A description will now be given of a zoom lens and an image-pickup apparatus having the same according to embodiments of the present invention. The zoom lens of the invention includes, in order from an object side to an image side, a first lens unit having a positive refractive power, a second lens unit having a negative refractive power, a third lens unit having a positive refractive power, and a fourth lens unit having a positive refractive power. Each lens unit moves from a wide-angle end (short focal length end) to a telephoto end (long focal length end) in zooming.

Figure 1:
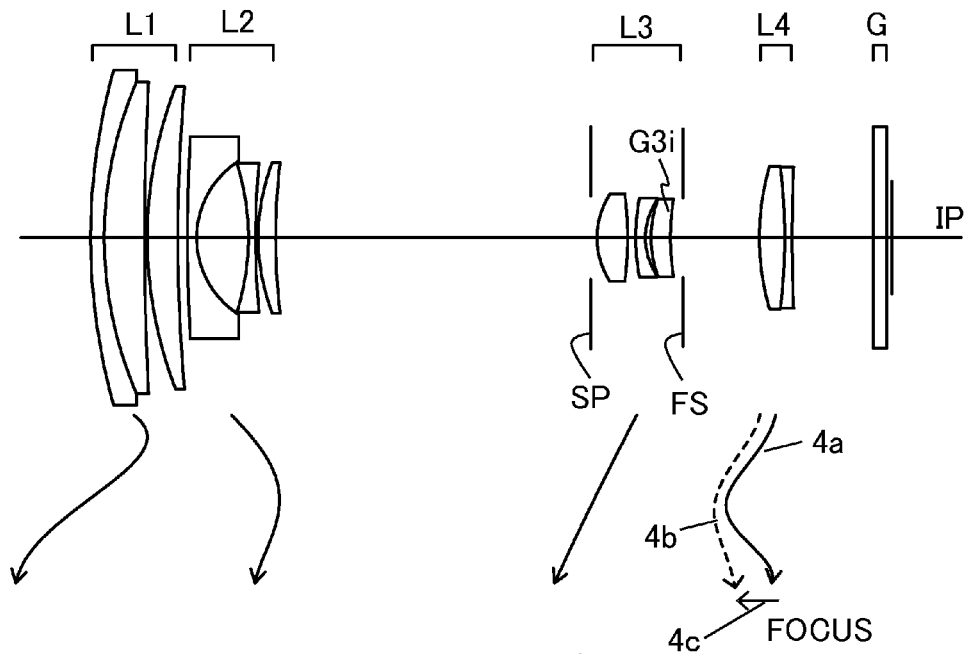
FIG. 1 is a lens sectional view of a zoom lens at a wide-angle end according to a first embodiment.
Figure 2A:
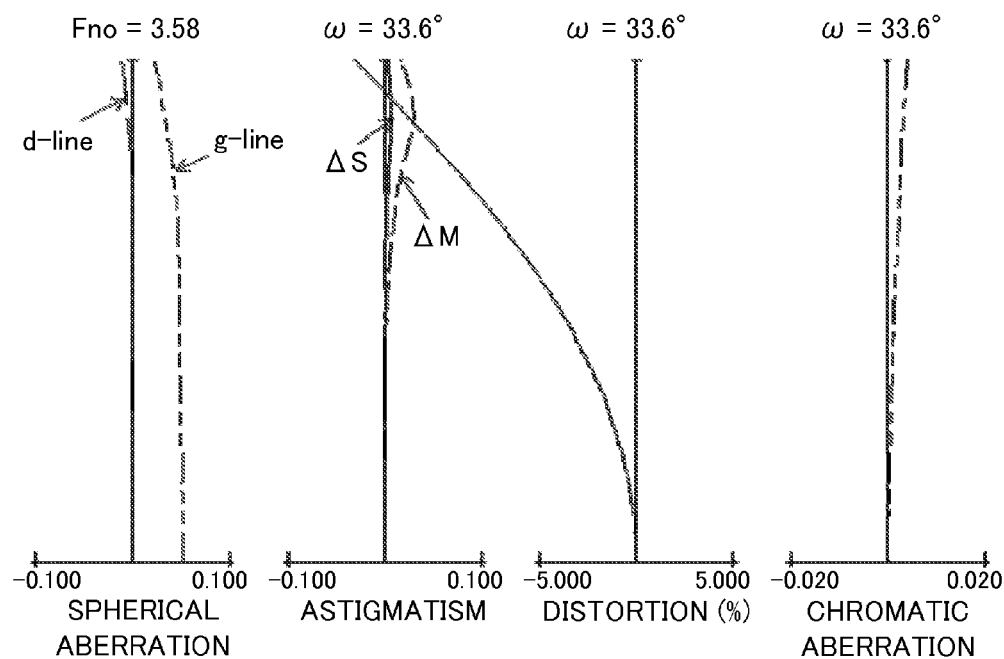
FIGS. 2A, 2B, and 2C are aberrational diagrams at a wide-angle end, an intermediate zoom position, and a telephoto end according to the first embodiment.
Figure 2B:
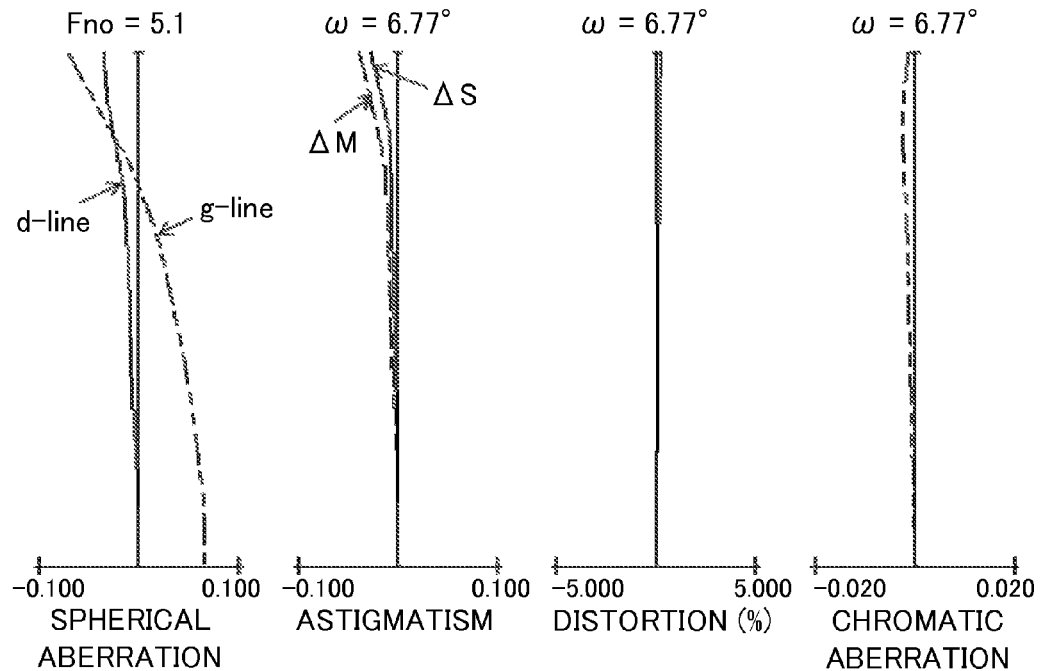
Figure 2C:
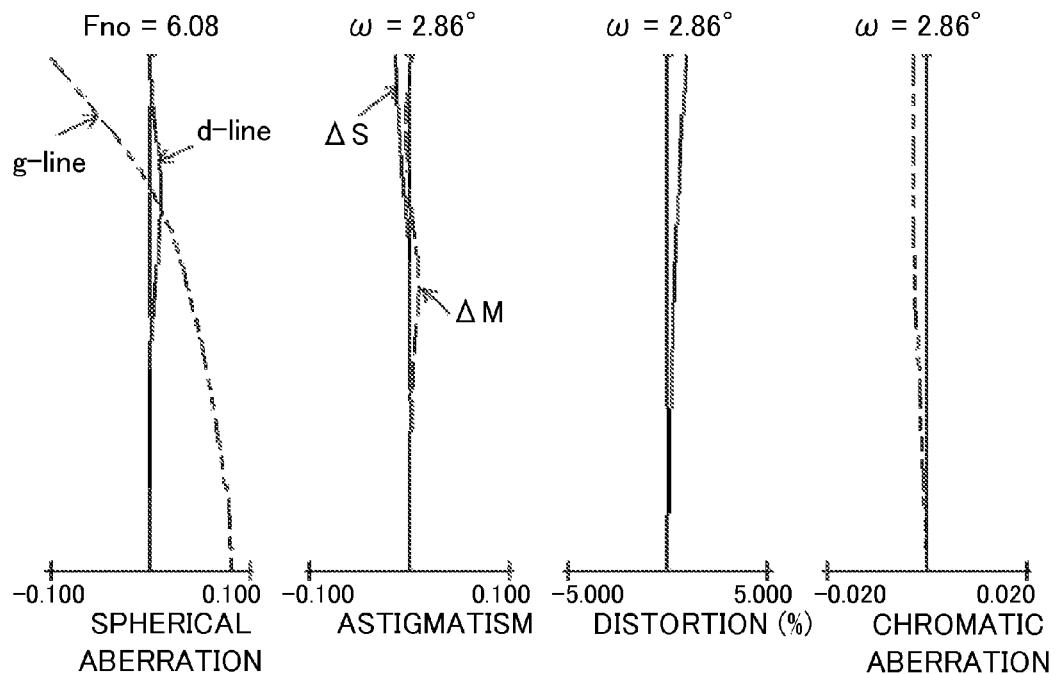
Figure 3:
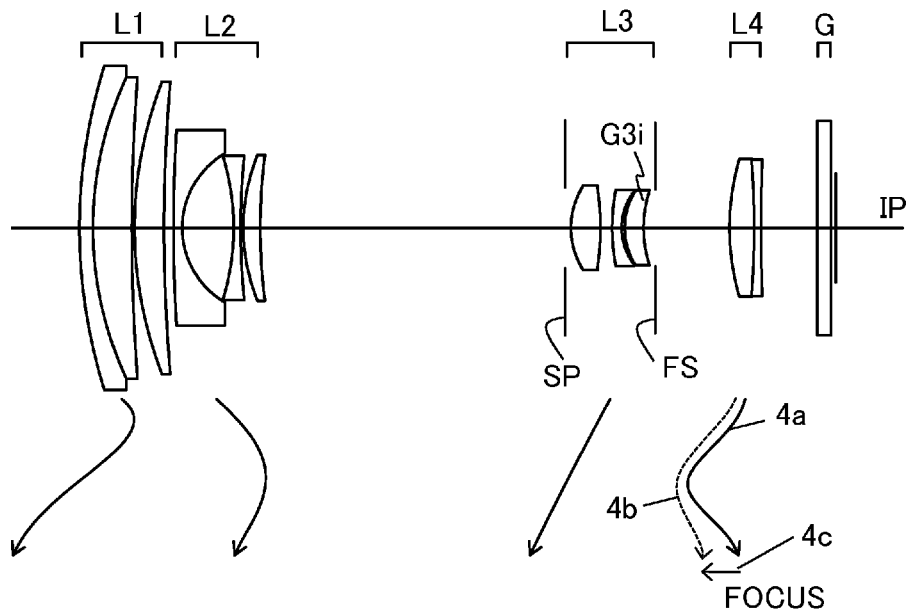
FIG. 3 is a lens sectional view of a zoom lens at a wide-angle end according to a second embodiment.
Figure 4A:
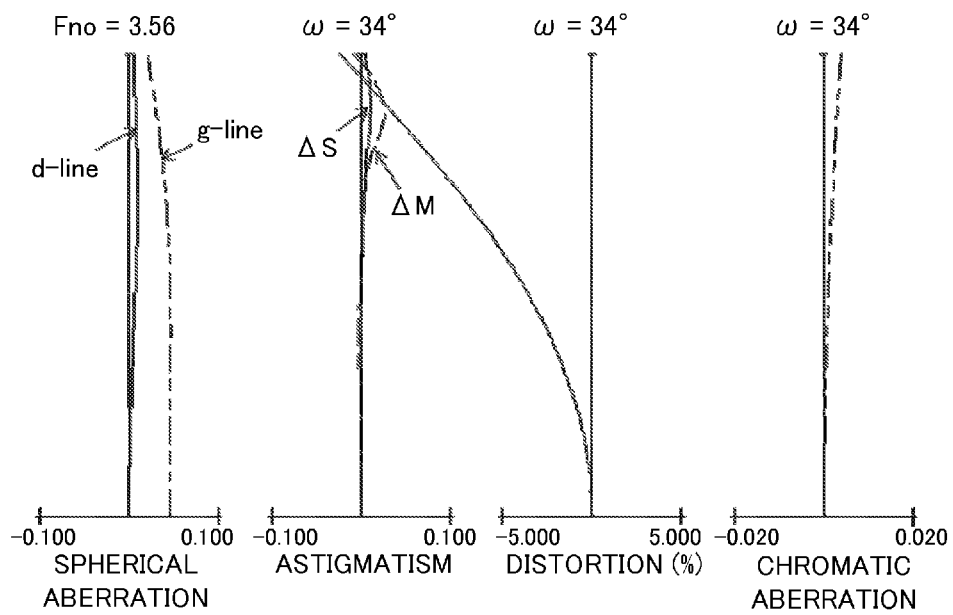
FIGS. 4A, 4B, and 4C are aberrational diagrams at a wide-angle end, an intermediate zoom position, and a telephoto end according to the second embodiment.
Figure 4B:
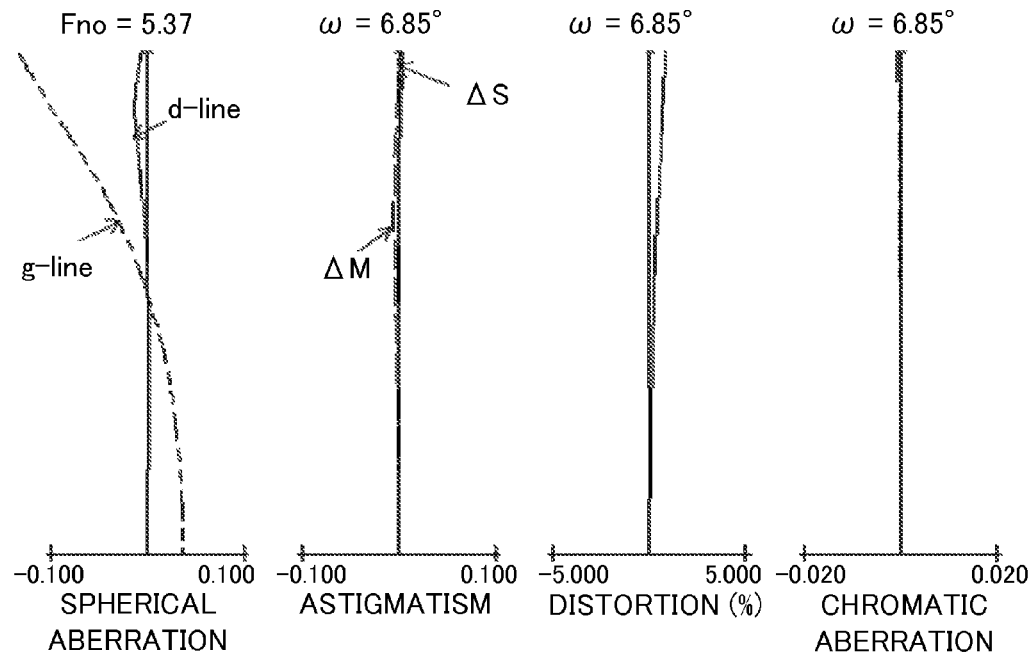
Figure 4C:
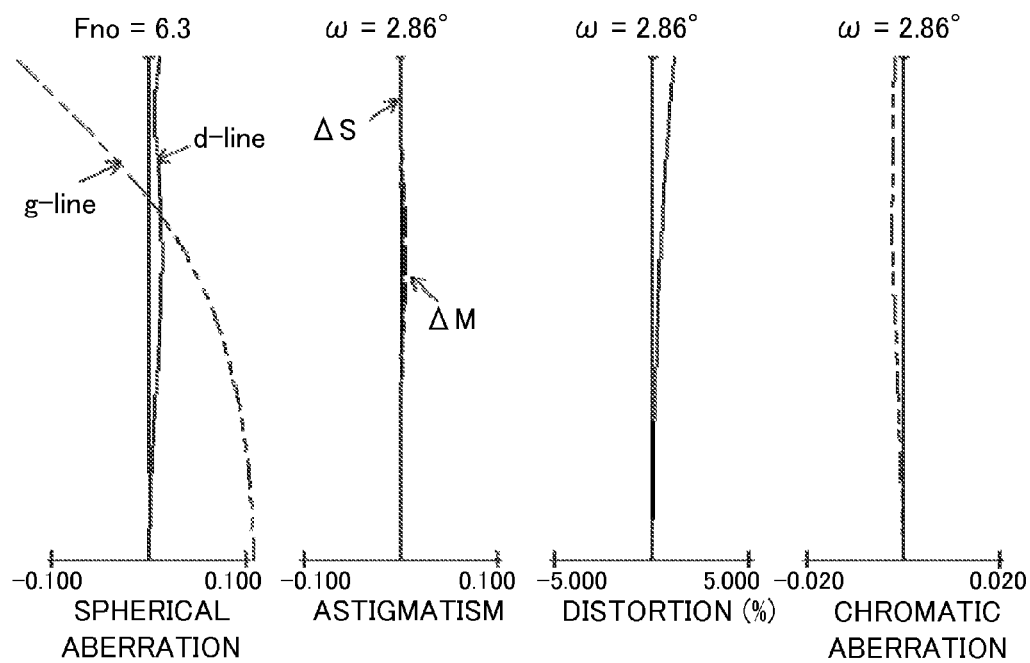
Figure 5:
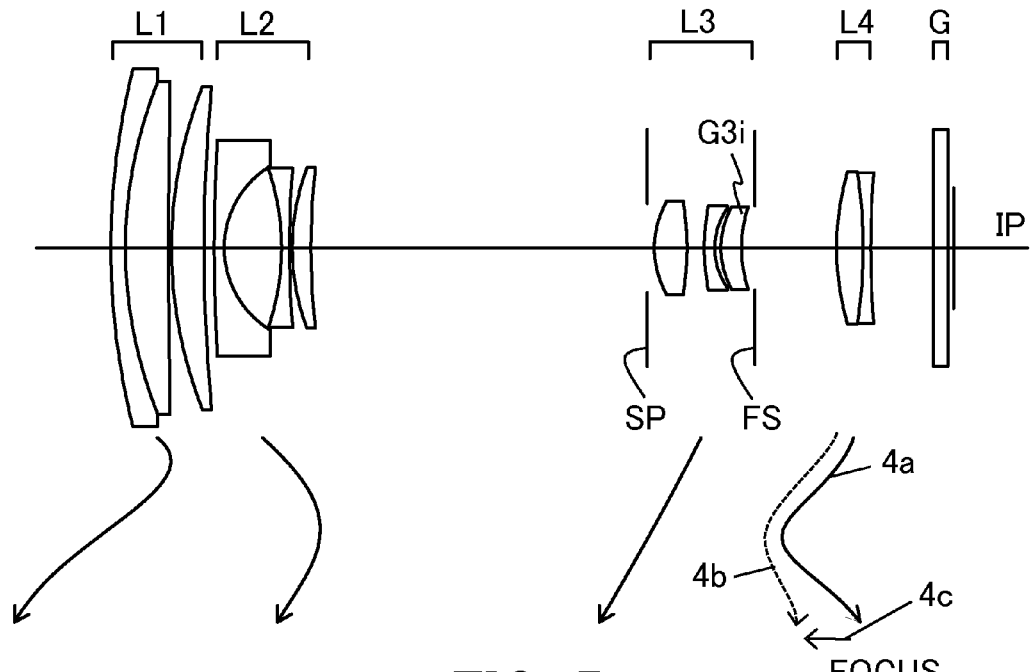
FIG. 5 is a lens sectional view of a zoom lens at a wide-angle end according to a third embodiment.
Figure 6A:
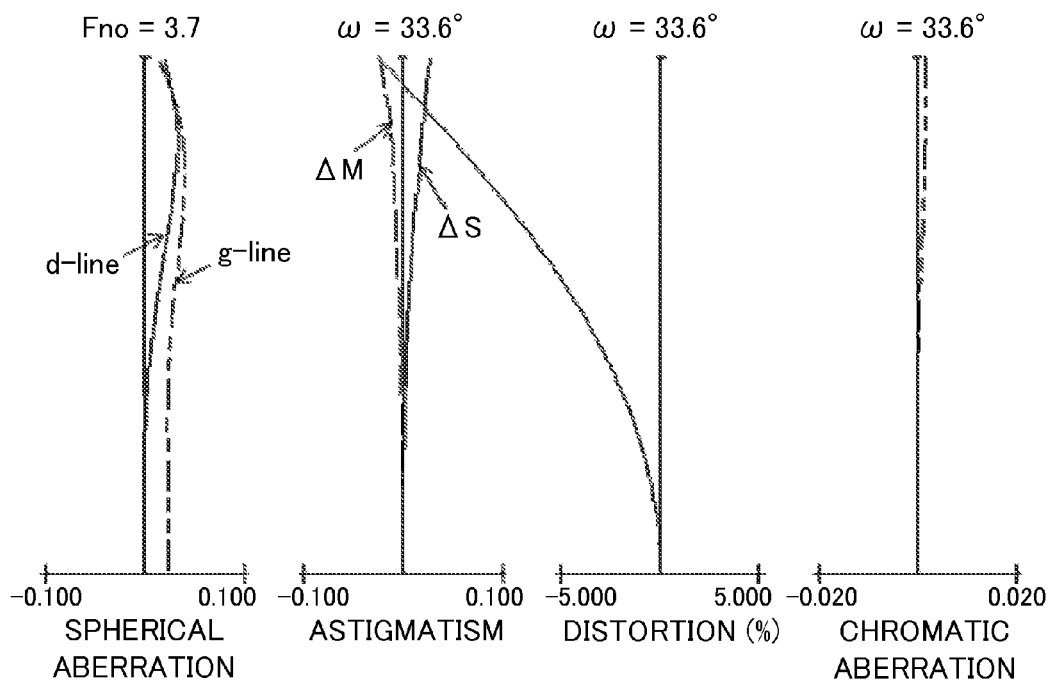
FIGS. 6A, 6B, and 6C are aberrational diagrams at a wide-angle end, an intermediate zoom position, and a telephoto end according to the third embodiment.
Figure 6B:
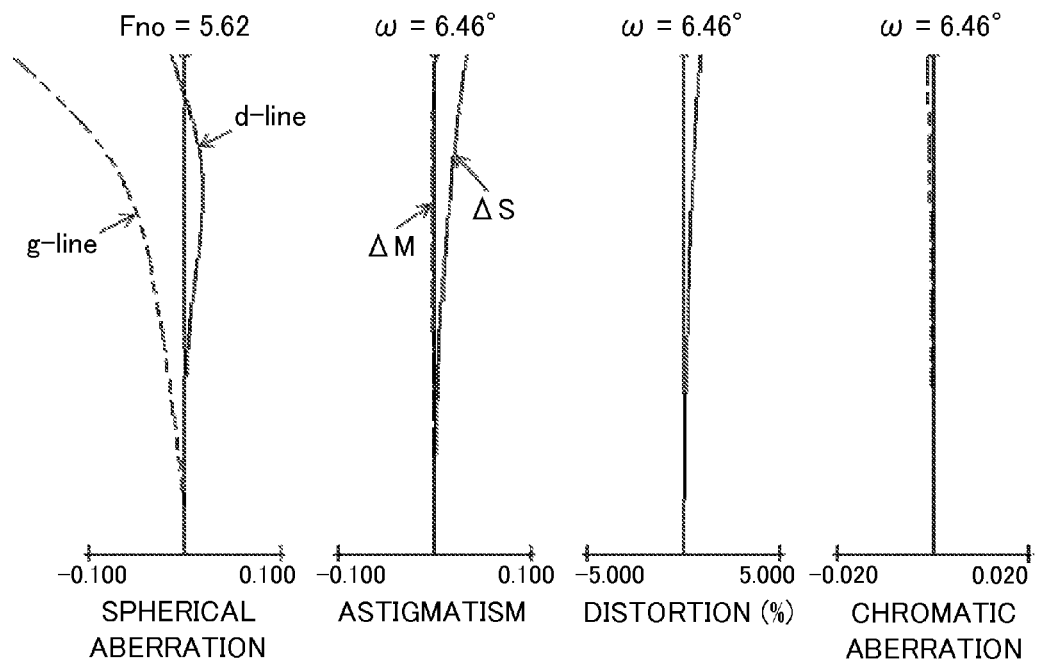
Figure 6C:
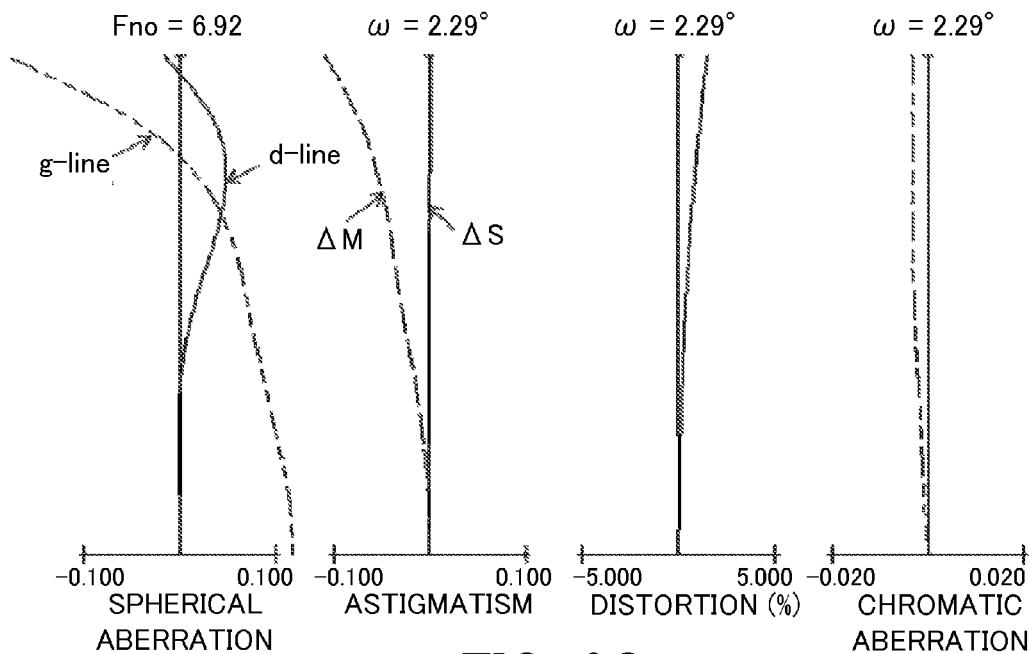
Figure 7:
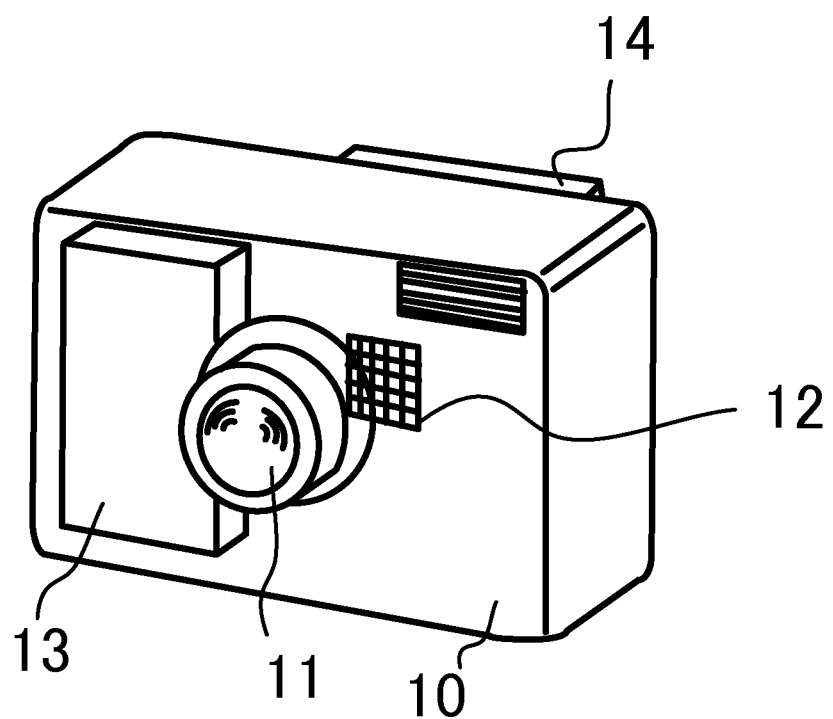
FIG. 7 is a schematic diagram of a principal part of an image-pickup apparatus according to the invention.

FIG. 1 is a lens sectional view of a zoom lens at a wide-angle end according to a first embodiment of the present invention. FIGS. 2A, 2B, and 2C are aberrational diagrams at a wide-angle end, an intermediate zoom position, and a telephoto end according to the first embodiment, respectively. FIG. 3 is a lens sectional view at a wide-angle end of a zoom lens according to a second embodiment of the present invention. FIGS. 4A, 4B, and 4C are aberrational diagrams at a wide-angle end, an intermediate zoom position, and a telephoto end of the second embodiment, respectively. FIG. 5 is a lens sectional view at a wide-angle end of a zoom lens according to a third embodiment of the present invention. FIGS. 6A, 6B, and 6C are aberrational diagrams at a wide-angle end, an intermediate zoom position, and a telephoto end according to the third embodiment, respectively. FIG. 7 is a schematic diagram of a principal part of a digital still camera (image-pickup apparatus) including the zoom lens according to the present invention.

A zoom lens according to each of the first to third embodiments is an image-pickup optical system used for an image-pickup apparatus. In a lens sectional view, a left side is an object side (front), and a right side is an image side (rear). L1 denotes a first lens unit having a positive refractive power, L2 denotes a second lens unit having a negative refractive power, L3 denotes a third lens unit having a positive refractive power, and L4 denotes a fourth lens unit having a positive refractive power. SP denotes an F-number determination diaphragm (aperture diaphragm) that limits a release F-number luminous flux.

The aperture diaphragm SP is disposed on the object side of the third lens unit L3. FS denotes a flare-cut diaphragm, and is disposed on an image side of the third lens unit L3. G denotes an optical block corresponding to an optical filter, a face plate, and the like. IP denotes an image plane that corresponds to an image-pickup plane of a solid-state image sensor (photoelectric conversion element) such as a CCD sensor and a COMS sensor for an image-pickup optical system of a video camera and a digital camera, and that corresponds to a film plane for an image-pickup optical system for a film-based camera.

In the aberrational diagram, Fno denotes an F-number, ω denotes a half field angle (degree) of a photographing field angle. A d-line (solid line) and a g-line (dotted line) are illustrated in a spherical aberration, ΔM and ΔS for the d-line are illustrated in an astigmatism, and the d-line is illustrated in a distortion. An aberration of the g-line relative to the d-line is illustrated in a lateral chromatic aberration.

In each embodiment below, the wide-angle end refers to an arrangement of each lens unit at the minimum focal length, and a telephoto end refers to an arrangement of each lens unit at the maximum focal length. An arrow indicates a locus of each lens unit in zooming from the wide-angle end to the telephoto end, and a moving direction in focusing.

In each embodiment, in zooming from the wide-angle end to the telephoto end, the first lens unit L1 moves to the object side after it moves to the image side as indicated by the arrow. In other words, the first lens unit L1 moves to the image side along a convex locus. The second lens unit L2 moves to the object side along a concave locus, and the third lens unit L3 moves to the object side. A fluctuation of the image plane due to a variable magnification is corrected by moving the fourth lens unit L4 to the object side along a convex locus.

Each lens unit moves in zooming so that a distance between the first lens unit L1 and the second lens unit L2 is longer, a distance between the second lens unit L2 and the third lens unit L3 is narrower, and a distance between the third lens unit L3 and the fourth lens unit L4 is longer at the telephoto end than at the wide-angle end. In addition, a rear focus type is employed which provides focusing by moving the fourth lens unit L4 on the optical axis. A curve 4a of a solid line and a curve 4b of a dotted line related to the fourth lens unit L4 are moving trajectories for correcting the fluctuation of the image plane caused by the variable magnification in focusing upon the infinity object and in focusing upon the short distance object, respectively.

In each embodiment, in focusing from the infinity object to the short distance object at the telephoto end, the fourth lens unit is moved to the front side as indicated by an arrow 4c. The aperture diaphragm SP and the flare-cut diaphragm FS move along similar moving trajectories to the locus of the third lens unit L3 in zooming. In the image pickup, the entire third lens unit L3 moves with a directional component vertical to the optical axis in the image stabilization. A part of the third lens unit L3 may move with the directional component vertical to the optical axis in the image stabilization.

In each embodiment, a positive lens G3$i$ having a concave surface on the image side and a meniscus shape closest to the image of the third lens unit L3. A high zoom ratio and a small overall system are achieved by appropriately setting a ratio of a radius of curvature of a lens surface on the image side of the positive lens G3$i$ to a focal length at the telephoto end of the overall system. More specifically, assume that R3$i$2 is the radius of curvature of the lens surface on the image side of the positive lens G3$i$, and ft is the focal length of the overall system at the telephoto end. Then, the following conditional expression is satisfied:

$$0.03 < R3i2/ft < 0.25 \quad (1)$$

The conditional expression (1) defines a suitable ratio of the radius of curvature of the lens surface on the image side of the positive lens G3$i$ closest to the image in the third lens unit L3 to a focal length of the overall system at the telephoto end. When the value exceeds the upper limit of the conditional expression (1), the radius of curvature of the lens surface on the image side of the positive lens G3$i$ closest to the image in the third lens unit L3 is excessively high relative to the focal length of the overall system at the telephoto end. For this reason, it is difficult to set a principal point of the third lens unit L3 to be sufficiently distant on the object side. Then, the distance between principal points of the second and third lens units L2 and L3 at the telephoto end remains wide and it is difficult to achieve a high zoom ratio.

When the value is smaller than the lower limit of the conditional expression (1), the radius of curvature of a lens surface on the image side of the positive lens G3$i$ closest to the image in the third lens unit L3 is excessively small relative to the focal length of the overall system at the telephoto end. Then, the inward coma at the telephoto end and the negative spherical aberration increase, the contrast of the image decreases, and it is difficult to achieve a high zoom ratio. In each embodiment, a numerical range of the conditional expression (1) may be set as follows:

$$0.09 < R3i2/ft < 0.23 \quad (1a)$$

Each embodiment provides a compact zoom lens with a smaller number of lenses while achieving a high zoom ratio of about 15 to 20 through the above configuration. Each embodiment may satisfy one or more of the following conditional expressions. Now assume that R3$i$1 is a radius of curvature of a lens surface on the object side of the positive lens G3$i$ closest to the image in the third lens unit L3, vd3$i$ is an Abbe number of a material of the positive lens G3$i$, M3 is A moving amount of the third lens unit L3 in zooming from the wide-angle end to the telephoto end, and vd3$n$ is an Abbe number of a material of a negative lens in the third lens unit.

The moving amount M3 of the third lens unit L3 is a difference between a position of the third lens unit L3 on the optical axis at the wide-angle end and a position of the third lens unit L3 on the optical axis at the telephoto end. A sign of the moving amount M3 of the third lens unit L3 is plus when it is positioned on the image side at the telephoto end compared to the wide-angle end. Then, one of the conditional expressions may be satisfied.

$$0.02 < R3i1/ft < 0.13 \quad (2)$$

$$65.0 < vd3i \quad (3)$$

$$3.0 < |M3|/fw < 5.0 \quad (4)$$

$$25.0 < vd3n < 40.0 \quad (5)$$

The conditional expression (2) defines a suitable ratio of a radius of curvature of a lens surface on the object side of the positive lens G3$i$ closest to the image side in the third lens unit L3 to a focal length of the overall system at the telephoto end. When the value exceeds the upper limit in the conditional expression (2), the radius of curvature of the convex lens surface on the object side in the positive lens G3$i$ closest to the image side in the third lens unit L3 is excessively high relative to the focal length of the overall system at the telephoto end. As a result, the focal length of the positive lens G3$i$ cannot be sufficiently shortened.

Then, an outward coma at the telephoto end and a positive spherical aberration increase, and it is difficult to achieve a high zoom ratio. When the value is smaller than the lower limit in the conditional expression (2), the radius of curvature of the lens surface on the object side on the positive lens G3$i$ closest to the image side in the third lens unit L3 is excessively small relative to the focal length of the overall system at the telephoto end. Then, an inward coma at the telephoto end and a negative spherical aberration increase, and it is difficult to achieve a high zoom ratio.

The conditional expression (3) defines an Abbe number of a material of the positive lens G3$i$ closest to the image side in the third lens unit L3. When the value is smaller than the lower limit of the conditional expression (3), a dispersion of the material of the positive lens G3$i$ is excessively high. Thus, an axial chromatic aberration at the telephoto side deteriorates, the contrast of the image decreases, and it is difficult to achieve a high zoom ratio.

The conditional expression (4) defines a suitable ratio of a moving amount of the third lens unit L3 in zooming from the wide-angle end to the telephoto end relative to a focal length of the overall system at the telephoto end. When the value exceeds the upper limit in the conditional expression (4), a change of a position at which a luminous flux around the image passes through the third lens unit L3 between the wide-angle end and the telephoto end becomes significant. As a result, it is difficult to properly correct various aberrations such as the coma all over the zooming area, and to achieve a high zoom ratio.

When the value is smaller than the lower limit in the conditional expression (4), an absolute value of the focal length of each lens unit must decrease for a high zoom ratio. Then, a radius of curvature of a lens surface of each lens decreases, the number of lenses increases, the lens unit becomes thicker, and it is difficult to miniaturize the overall system.

The conditional expression (5) defines an Abbe number of a material of the negative lens of the third lens unit L3. When the value exceeds the upper limit in the conditional expression (5), a dispersion of the material of the negative lens of the third lens unit L3 is excessively small. Thus, an axial chromatic aberration at the telephoto side deteriorates and it is difficult to achieve a high zoom ratio. When the value is smaller than the lower limit in the conditional expression (5), the dispersion of the material of the negative lens in the third lens unit L3 is excessively high. Thus, an axial chromatic aberration at the telephoto side deteriorates, the contrast of the image decreases, and it is difficult to achieve a high zoom ratio. The numerical ranges of the conditional expressions (2) to (5) may be set as below:

$$0.05 < R3i1/ft < 0.11 \quad (2a)$$

$$70.0 < \nu d3i \quad (3a)$$

$$3.2 < |M3|/fw < 4.0 \quad (4a)$$

$$27.0 < \nu d3n < 37.0 \quad (5a)$$

When each element is specified as above, the zoom lens can become smaller with the smaller number of lenses and a high zoom ratio of 15 or more.

A description will now be given of a lens configuration of each embodiment. In each embodiment, the first lens unit L1 having a positive refractive power includes a negative lens and two positive lenses. Thus, a high zoom ratio is achieved with a smaller number of lenses and a well-corrected axial chromatic aberration at the telephoto end. In addition, a small effective diameter of the front lens is attempted when the first lens unit L1 moves to the object side with a convex locus to the image side during zooming.

In each embodiment, the second lens unit L2 having a negative refractive power includes, in order from the object side to the image side, three lenses having a negative lens having a concave surface facing the image side, a negative lens, and a positive meniscus lens having a convex surface facing the object side. Thus, the aberrational fluctuation is effectively restrained during zooming with a high zoom ratio. The second lens unit L2 moves to the image side with a convex locus to the image side during zooming.

In each embodiment, the third lens unit L3 having a positive refractive power includes one or more positive lenses and one or more negative lenses. More specifically, the third lens unit L3 includes, in order from the object side to the image side, a positive lens having a convex surface facing the object side, a negative lens having a convex surface facing the object side, and a positive lens having a concave surface facing the image side. The positive lens closest to the object side in the third lens unit L3 has a lens surface on the object side and a lens surface on the image side, both having aspherical shapes. Thus, a spherical aberration, a coma, and the like are well-corrected with a smaller number of lenses. The third lens unit L3 moves to the object side during zooming from the wide-angle end to the telephoto end.

In each embodiment, the third lens unit L3 wholly or partially moves with a directional component perpendicular to the optical axis. This configuration moves an imaging position a direction vertical to the optical axis. In other words, the image stabilization corrects image blurring caused by the camera shaking and the like. Each embodiment effectively provides the image stabilization with a small moving amount of a lens by making a moving amount of an imaging position larger than a moving amount in a direction orthogonal to an optical axis of the third lens unit L3.

In each embodiment, the fourth lens unit L4 having a positive refractive power is a cemented lens made by cementing a positive lens and a negative lens. Then, focusing is performed by moving the fourth lens unit L4 along an optical axis. In this way, a fluctuation of a chromatic aberration during a high-speed focusing is restrained by reducing a weight of a moving lens unit.

In each embodiment, an aperture diaphragm SP may have a variable or invariable aperture area. The aperture diaphragm SP may move along a different locus from that of each lens unit during zooming. When a zoom lens of each embodiment is applied to an image-pickup apparatus, a distortion and a chromatic aberration may be electrically corrected for a captured image. Thus, an image with little residual aberration can be easily obtained.

A description will now be given of hereinafter, numerical examples 1 to 3 corresponding to the respective embodiments 1 to 3. In each numerical example, "i" denotes an order of a surface from the object side, "ri" denotes an $i^{th}$ radius of curvature (of an $i^{th}$ surface), "di" denotes a distance from an $(i+1)^{th}$ surface, and "ndi" and "vdi" denote a refractive index and an Abbe number of a material of an $i^{th}$ optical element for the d-line, respectively. In addition, in numerical examples 1 to 3, two surfaces closest to the image side are planes corresponding to an optical block. For the aspherical shape, a displacement in an optical axis direction at a position of a height H from an optical axis is set to X based on a surface vertex. A traveling direction of the light is set to be positive, R denotes a paraxial radius of curvature, k denotes a conic constant, and A4, A6, A8, and A10 denote aspherical surface coefficients, respectively. Then, the following expression is established:

$$x = \frac{H^2/R}{1 + \sqrt{1-(1+k)(H/R)^2}} + A4H^4 + A6H^6 + A8H^8 + A10H^{10}$$

Herein, * denotes an aspherical surface. "e-x" denotes $10^{-x}$. BF denotes a back focus, and a distance from a final lens surface to an image plane is indicated by an air reduced quantity. The overall lens length is a value obtained by adding the back focus to the length from the first lens surface to the final lens surface. A relationship between each conditional expression described above and various numerical values in the numerical examples is illustrated in Table 1.

Numerical Example 1

Unit mm

Surface data

| Surface No. | r | d | nd | vd |
|---|---|---|---|---|
| 1 | 44.484 | 1.00 | 1.85478 | 24.8 |
| 2 | 28.329 | 2.90 | 1.49700 | 81.5 |
| 3 | 209.407 | 0.20 | | |
| 4 | 30.289 | 2.20 | 1.69680 | 55.5 |
| 5 | 124.464 | (variable) | | |
| 6 | 139.397 | 0.65 | 1.80400 | 46.6 |
| 7 | 6.596 | 3.74 | | |
| 8 | −17.756 | 0.50 | 1.69680 | 55.5 |
| 9 | 53.777 | 0.20 | | |
| 10 | 15.073 | 1.25 | 1.95906 | 17.5 |
| 11 | 45.148 | (variable) | | |
| 12(diaphragm) | ∞ | 0.46 | | |
| 13* | 5.525 | 2.20 | 1.55332 | 71.7 |
| 14* | −24.638 | 0.59 | | |
| 15 | 14.539 | 0.70 | 1.80610 | 33.3 |
| 16 | 4.821 | 0.40 | | |
| 17 | 7.733 | 1.40 | 1.48749 | 70.2 |
| 18 | 17.589 | 0.90 | | |
| 19 | ∞ | (variable) | (flare-cutting diaphragm) | |
| 20 | 18.200 | 1.85 | 1.77250 | 49.6 |
| 21 | −39.183 | 0.50 | 1.80518 | 25.4 |
| 22 | 104.375 | (variable) | | |
| 23 | ∞ | 1.00 | 1.51633 | 64.1 |
| 24 | ∞ | 1.00 | | |
| Image plane | ∞ | | | |

Aspherical surface data

Thirteenth surface

K = −2.77412e−002  A4 = −4.95264e−004  A6 = −1.36656e−005
A8 = 3.07429e−007  A10 = −3.98209e−008

Fourteenth surface

K = −1.08538e+001  A4 = 1.07778e−004  A6 = −2.95978e−006

Variable data
Zoom ratio 15.12

| | Wide-angle | intermediate | telephoto |
|---|---|---|---|
| Focal length | 5.13 | 32.66 | 77.60 |
| Fno | 3.58 | 5.10 | 6.08 |
| Half angle of view (°) | 33.60 | 6.77 | 2.86 |
| Image height | 3.41 | 3.88 | 3.88 |
| Overall lens length | 58.02 | 69.23 | 81.85 |
| BF | 7.50 | 17.48 | 8.27 |
| d5 | 0.70 | 21.50 | 29.28 |
| d11 | 22.68 | 3.74 | 1.39 |
| d19 | 5.50 | 4.88 | 21.28 |
| d22 | 5.84 | 15.82 | 6.61 | zoom lens unit data

| unit | starting surface | focal length |
|---|---|---|
| 1 | 1 | 46.34 |
| 2 | 6 | −7.81 |
| 3 | 12 | 14.46 |
| 4 | 20 | 29.10 |
| 5 | 23 | ∞ |

Numerical Example 2

Unit mm

Surface data

| Surface No. | r | d | nd | vd |
|---|---|---|---|---|
| 1 | 40.393 | 1.00 | 1.85478 | 24.8 |
| 2 | 26.579 | 2.90 | 1.49700 | 81.5 |
| 3 | 147.678 | 0.20 | | |
| 4 | 30.066 | 2.20 | 1.69680 | 55.5 |
| 5 | 129.148 | (variable) | | |
| 6 | 116.403 | 0.65 | 1.80400 | 46.6 |
| 7 | 6.456 | 3.84 | | |
| 8 | −18.026 | 0.50 | 1.69680 | 55.5 |
| 9 | 50.079 | 0.20 | | |
| 10 | 14.479 | 1.25 | 1.95906 | 17.5 |
| 11 | 39.813 | (variable) | | |
| 12(diaphragm) | ∞ | 0.46 | | |
| 13* | 5.635 | 2.20 | 1.55332 | 71.7 |
| 14* | −18.059 | 0.86 | | |
| 15 | 14.373 | 0.70 | 1.80610 | 33.3 |
| 16 | 4.399 | 0.24 | | |
| 17 | 5.161 | 1.40 | 1.48749 | 70.2 |
| 18 | 8.809 | 0.90 | | |
| 19 | ∞ | (variable) | (flare-cutting diaphragm) | |
| 20 | 18.200 | 1.85 | 1.77250 | 49.6 |
| 21 | −59.285 | 0.50 | 1.80518 | 25.4 |
| 22 | 136.624 | (variable) | | |
| 23 | ∞ | 1.00 | 1.51633 | 64.1 |
| 24 | ∞ | 1.00 | | |
| Image plane | ∞ | | | |

Aspherical surface data

Thirteenth surface

K = −1.22756e−001  A4 = −4.57597e−004  A6 = −6.07163e−006
A8 = −1.09704e−007  A10 = −1.03455e−008

Fourteenth surface

K = −9.28657e+000  A4 = 1.29315e−004  A6 = −1.56686e−006

Variable data
Zoom ratio 15.36

| | Wide-angle | intermediate | telephoto |
|---|---|---|---|
| Focal length | 5.05 | 32.27 | 77.60 |
| Fno | 3.56 | 5.37 | 6.30 |
| Half angle of view (°) | 34.02 | 6.85 | 2.86 |
| Image height | 3.41 | 3.88 | 3.88 |
| Overall lens length | 57.22 | 65.33 | 80.75 |
| BF | 6.49 | 18.72 | 7.96 |
| d5 | 0.70 | 19.46 | 28.14 |
| d11 | 22.68 | 3.11 | 1.43 |
| d19 | 5.50 | 2.19 | 21.38 |
| d22 | 4.83 | 17.06 | 6.30 | zoom lens unit data

| unit | starting surface | focal length |
|---|---|---|
| 1 | 1 | 45.33 |
| 2 | 6 | −7.65 |
| 3 | 12 | 13.78 |
| 4 | 20 | 27.51 |
| 5 | 23 | ∞ |

Numerical Example 3

Unit mm

Surface data

| Surface No. | r | d | nd | vd |
|---|---|---|---|---|
| 1 | 49.142 | 1.00 | 1.85478 | 24.8 |
| 2 | 30.028 | 2.90 | 1.49700 | 81.5 |
| 3 | 579.637 | 0.20 | | |
| 4 | 29.581 | 2.20 | 1.69680 | 55.5 |
| 5 | 116.032 | (variable) | | |
| 6 | 152.158 | 0.65 | 1.80400 | 46.6 |
| 7 | 6.515 | 3.88 | | |
| 8 | −16.396 | 0.50 | 1.69680 | 55.5 |
| 9 | 58.903 | 0.20 | | |
| 10 | 15.090 | 1.25 | 1.95906 | 17.5 |
| 11 | 45.612 | (variable) | | |
| 12(diaphragm) | ∞ | 0.46 | | |
| 13* | 6.052 | 2.20 | 1.55332 | 71.7 |
| 14* | −18.240 | 1.16 | | |
| 15 | 14.479 | 0.70 | 1.80610 | 33.3 |
| 16 | 4.649 | 0.42 | | |
| 17 | 5.639 | 1.40 | 1.49700 | 81.5 |
| 18 | 9.004 | 0.90 | | |
| 19 | ∞ | (variable) | (flare-cutting diaphragm) | |
| 20 | 18.200 | 1.80 | 1.88300 | 40.8 |
| 21 | −32.070 | 0.50 | 1.80518 | 25.4 |
| 22 | 62.872 | (variable) | | |
| 23 | ∞ | 1.00 | 1.51633 | 64.1 |
| 24 | ∞ | 1.00 | | |
| Image plane | ∞ | | | |

Aspherical surface data

Thirteenth surface

K = −1.04388e−001    A4 = −4.20600e−004    A6 = −2.31712e−005
A8 = 5.05033e−007    A10 = −5.60137e−008

Fourteenth surface

K = −6.23141e+000    A4 = 1.02032e−004    A6 = −2.12332e−005

Variable data
Zoom ratio 18.90

| | Wide-angle | intermediate | telephoto |
|---|---|---|---|
| Focal length | 5.13 | 34.25 | 97.01 |
| Fno | 3.70 | 5.62 | 6.92 |
| Half angle of view (°) | 33.59 | 6.46 | 2.29 |
| Image height | 3.41 | 3.88 | 3.88 |
| Overall lens length | 58.43 | 67.48 | 84.56 |
| BF | 7.23 | 20.11 | 6.02 |
| d5 | 0.70 | 20.27 | 29.56 |
| d11 | 22.68 | 3.21 | 1.33 |
| d19 | 5.50 | 1.57 | 25.34 |
| d22 | 5.57 | 18.45 | 4.36 | zoom lens unit data

| unit | starting surface | focal length |
|---|---|---|
| 1 | 1 | 45.15 |
| 2 | 6 | −7.51 |
| 3 | 12 | 14.52 |
| 4 | 20 | 25.77 |
| 5 | 23 | ∞ |

TABLE 1

| | Conditional expression | First embodiment | Second embodiment | Third embodiment |
|---|---|---|---|---|
| (1) | $R3i2/ft$ | 0.227 | 0.114 | 0.093 |
| (2) | $R3i1/ft$ | 0.100 | 0.067 | 0.058 |
| (3) | $vd3i$ | 70.2 | 70.2 | 70.2 |
| (4) | $|M3|/fw$ | 3.628 | 3.435 | 3.224 |
| (5) | $vd3n$ | 33.3 | 33.3 | 33.3 |

Referring now to FIG. 7, a description will be given of an embodiment of a digital still camera (image-pickup apparatus) using the zoom lens according to one of the first to third embodiments for the image-pickup optical system.

In FIG. 7, reference numeral 10 denotes a main body of an image-pickup apparatus. Reference number 11 denotes an image-pickup optical system including a zoom lens according to the present invention, and reference numeral 12 denotes an image sensor (photoelectric conversion element) such as a CCD sensor and a CMOS sensor configured to receive an object image formed by the image-pickup optical system 11. Reference numeral 13 denotes a recorder configured to record an object image received by the image sensor 12, and reference numeral 14 denotes a viewfinder used to observe an object image displayed on a display unit (not illustrated). The display unit includes a liquid crystal panel and the like, and displays an object image formed on the image sensor 12.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-207972, filed Sep. 21, 2012, which is hereby incorporated by reference herein in its entirety.

What is claimed is:

1. A zoom lens comprising, in order from an object side to an image side:
   a first lens unit having a positive refractive power;
   a second lens unit having a negative refractive power;
   a third lens unit having a positive refractive power; and
   a fourth lens unit having a positive refractive power,
   wherein each lens unit moves so that a distance between adjacent lens units changes during zooming,
   wherein the third lens unit includes a plurality of lenses, including a positive meniscus lens G3$i$ having a concave surface,
   wherein the positive meniscus lens G3$i$, among all of the lenses included in the third lens unit, is disposed closest to the image side, and with the concave surface thereof disposed closest to the image side, and
   wherein the following conditional expressions are satisfied:

$0.03 < R3i2/ft < 0.25$; and $0.02 < R3i1/ft < 0.13$, where R3$i$2 is a radius of curvature of the concave surface on the image side of the positive meniscus lens G3$i$, R3$i$1 is a radius of curvature of a lens surface on the object side of the positive meniscus lens G3$i$, and ft is a focal length of the zoom lens at a telephoto end.

2. The zoom lens according to claim 1, wherein a conditional expression $3.0 < |M3|/fw < 5.0$ is satisfied, where M3 is a moving amount of the third lens unit during zooming from a wide-angle end to the telephoto end, and fw is a focal length of the zoom lens at the wide-angle end.

3. The zoom lens according to claim 1, wherein the third lens unit includes one or more negative lenses and one or more positive lenses.

4. The zoom lens according to claim 3, wherein a conditional expression $25.0<vd3n<40.0$ is satisfied, where vd3n is an Abbe number of a material of the negative lens included in the third lens unit.

5. The zoom lens according to claim 1, wherein the third lens unit includes, in order from the object side to the image side, a positive lens, a negative lens, and the positive meniscus lens.

6. The zoom lens according to claim 1, wherein the third lens unit L3 moves with a directional component vertical to an optical axis in an image stabilization.

7. The zoom lens according to claim 1, wherein the first and second lens units move with convex moving loci to the image side, the third lens unit moves to the object side, and the fourth lens unit moves to the object side with a convex locus in zooming from a wide-angle end to the telephoto end.

8. The zoom lens according to claim 1, wherein the first lens unit includes, in order from the object side to the image side, a cemented lens made by cementing a negative lens and a positive lens, and a positive lens, the second lens unit includes, in order from the object side to the image side, a negative lens, a negative lens, and a positive lens, and the fourth lens is a cemented lens obtained by cementing a positive lens and a negative lens.

9. An image-pickup apparatus comprising:
a zoom lens; and
a solid-state image sensor configured to receive an image formed by the zoom lens,
wherein the zoom lens includes, in order from an object side to an image side:
a first lens unit having a positive refractive power;
a second lens unit having a negative refractive power;
a third lens unit having a positive refractive power; and
a fourth lens unit having a positive refractive power,
wherein each lens unit moves so that a distance between adjacent lens units changes during zooming,
wherein the third lens unit includes a plurality of lenses, including a positive meniscus lens G3$i$ having a concave surface,
wherein the positive meniscus lens G3$i$, among all of the lenses included in the third lens unit, is disposed closest to the image side, and with the concave surface thereof disposed closest to the image side, and
wherein the following conditional expressions are satisfied:

$$0.03<R3i2/ft<0.25; \text{ and}$$

$$0.02<|R3i1|/ft<0.13,$$

where R3$i$2 is a radius of curvature of the concave surface on the image side of the positive meniscus lens G3$i$, R3$i$1 is a radius of curvature of a lens surface on the object side of the positive meniscus lens G3$i$, and ft is a focal length of the zoom lens at a telephoto end.

10. A zoom lens comprising, in order from an object side to an image side:
a first lens unit having a positive refractive power;
a second lens unit having a negative refractive power;
a third lens unit having a positive refractive power; and
a fourth lens unit having a positive refractive power,
wherein each lens unit moves so that a distance between adjacent lens units changes during zooming,
wherein the third lens unit includes a plurality of lenses, including a positive meniscus lens G3$i$ having a concave surface,
wherein the positive meniscus lens G3$i$, among all of the lenses included in the third lens unit, is disposed closest to the image side, and with the concave surface thereof disposed closest to the image side, and
wherein the following conditional expressions are satisfied:

$$0.03<R3i2/ft<0.25; \text{ and}$$

$$3.0<|M3|/fw<5.0,$$

where R3$i$2 is a radius of curvature of the concave surface on the image side of the positive meniscus lens G3$i$, ft is a focal length of the zoom lens at a telephoto end, M3 is a moving amount of the third lens unit during zooming from a wide-angle end to the telephoto end, and fw is a focal length of the zoom lens at the wide-angle end.

* * * * *